(12) United States Patent
Li

(10) Patent No.: US 8,564,948 B2
(45) Date of Patent: Oct. 22, 2013

(54) ELECTRONIC DEVICE

(75) Inventor: Yang Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 192 days.

(21) Appl. No.: 13/226,358

(22) Filed: Sep. 6, 2011

(65) Prior Publication Data

US 2012/0170207 A1    Jul. 5, 2012

(30) Foreign Application Priority Data

Dec. 30, 2010  (CN) .......................... 2010 1 0614642

(51) Int. Cl.
*H05K 7/20* (2006.01)
(52) U.S. Cl.
USPC ............ 361/679.47; 361/679.49; 361/679.51; 361/695; 361/697; 165/80.3; 165/104.33; 165/121; 165/122; 454/184
(58) Field of Classification Search
USPC .......... 361/679.21, 679.46–679.54, 688, 689, 361/690–697, 715, 719–728; 165/80.3, 165/104.33, 104.34, 121–126, 185; 174/15.1, 16.3, 252; 349/58, 60–65, 349/161; 313/11, 13, 17, 22–25, 35, 36, 44, 313/46, 582; 454/184; 312/223.1, 223.2, 312/236
See application file for complete search history.

(56) References Cited

U.S. PATENT DOCUMENTS

| 6,104,451 | A  | * | 8/2000  | Matsuoka et al. ............... 349/58 |
|-----------|----|---|---------|---------------------------------------|
| 6,519,146 | B2 | * | 2/2003  | Nagashima et al. ...... 361/679.52    |
| 6,680,843 | B2 | * | 1/2004  | Farrow et al. ............ 361/679.02 |
| 6,798,655 | B2 | * | 9/2004  | Nagashima et al. ...... 361/679.21    |
| 7,064,954 | B1 | * | 6/2006  | Wu et al. ........................ 361/695 |
| 7,269,023 | B2 | * | 9/2007  | Nagano .......................... 361/752 |
| 7,570,489 | B1 | * | 8/2009  | Sun et al. ....................... 361/695 |
| 7,633,751 | B2 | * | 12/2009 | Shinotou et al. ............ 361/679.5 |
| 7,800,706 | B2 | * | 9/2010  | Kim et al. ........................ 349/58 |
| 8,035,968 | B2 | * | 10/2011 | Kwon et al. ................... 361/695 |
| 8,184,434 | B2 | * | 5/2012  | Elwany .......................... 361/695 |
| 8,248,784 | B2 | * | 8/2012  | Nakamichi et al. ......... 361/679.5 |
| 8,320,119 | B2 | * | 11/2012 | Isoshima et al. ......... 361/679.47 |
| 8,432,333 | B2 | * | 4/2013  | Isoshima et al. ................ 345/55 |
| 2007/0081109 | A1 | * | 4/2007 | Igarashi .......................... 349/58 |
| 2010/0172098 | A1 | * | 7/2010 | Isoshima et al. .............. 361/697 |
| 2012/0140399 | A1 | * | 6/2012 | Huang ..................... 361/679.31 |

* cited by examiner

*Primary Examiner* — Michail V Datskovskiy
(74) *Attorney, Agent, or Firm* — Altis & Wispro Law Group, Inc.

(57) ABSTRACT

An electronic device includes a display, a cover, and a blocking board. The display defines a rear side. A motherboard and a first cooling assembly are secured to the rear side of the display, and a second cooling assembly is secured to the motherboard. The cover is secured to the rear side for coving the rear side, and defines a number of air inlets and air outlets. The blocking board is secured to a side of the motherboard, and located between the first cooling assembly and the second cooling assembly. A first air path is defined by the air inlet, the display, the first cooling assembly, and the air outlet, and a second air path is defined by the air inlet, the motherboard, the second cooling assembly, and the air outlet. The first air path and the second air path are divided by the blocking board.

19 Claims, 4 Drawing Sheets

ELECTRONIC DEVICE

REARGROUND

1. Technical Field

The present disclosure relates to electronic devices, particularly to an electronic device with a heat dissipating assembly.

2. Description of Related Art

A cooling assembly is used for cooling each electronic component, such as a CPU or a HDD, in an electronic device, such as an all-in-one computer. However, the cooling assemblies occupy much space and impede cooling airflow.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
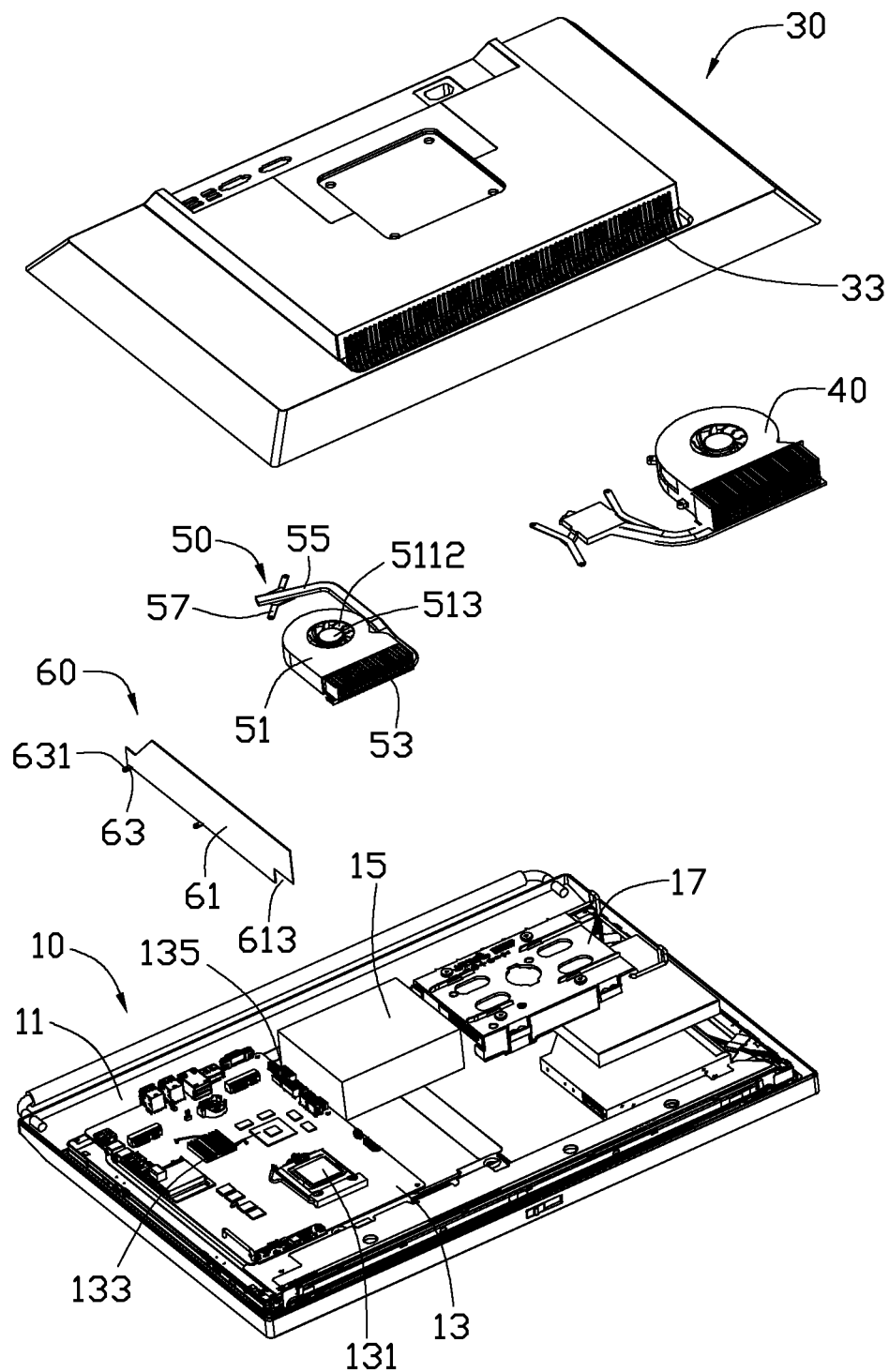
FIG. 1 is an exploded, isometric view of an electronic device in accordance with one embodiment.

Referring to FIG. 1, an electronic device includes a main body 10 and a cover 30 for coving the main body 10. In one embodiment, the electronic device is an all-in-one computer.

The main body 10 includes an enclosure 11. The enclosure 10 includes a front side and a rear side opposite to the front side. A display (not shown) is secured to the front side of the enclosure 11, and a motherboard 13 is secured to the rear side of the enclosure 11. A first heat component 131 and a second heat component 133 are secured to the motherboard 13. The motherboard 13 defines two mounting holes 135. The mounting holes 135 are adjacent to a side edge of the motherboard 13. A first electronic component 15 and a second electronic component 17 are secured to the rear side of the enclosure 11, and are located on a side of the motherboard 13. The first electronic component 15 is located between the second electronic component 17 and the motherboard 13. In one embodiment, the first heat component 131 is a central processing unit (CPU), the second heat component 133 is a video card, the first electronic component 15 is a power supply, and the second electronic component 17 is a hard disk drive (HDD).

A first side of the cover 30 defines a plurality of air inlets 31 (shown as FIG. 4), and a second side opposite to the first side of the cover 30 defines a plurality of air outlets 33.

The electronic device further includes a first cooling assembly 40, a second cooling assembly 50, and a blocking board 60.

Figure 2:
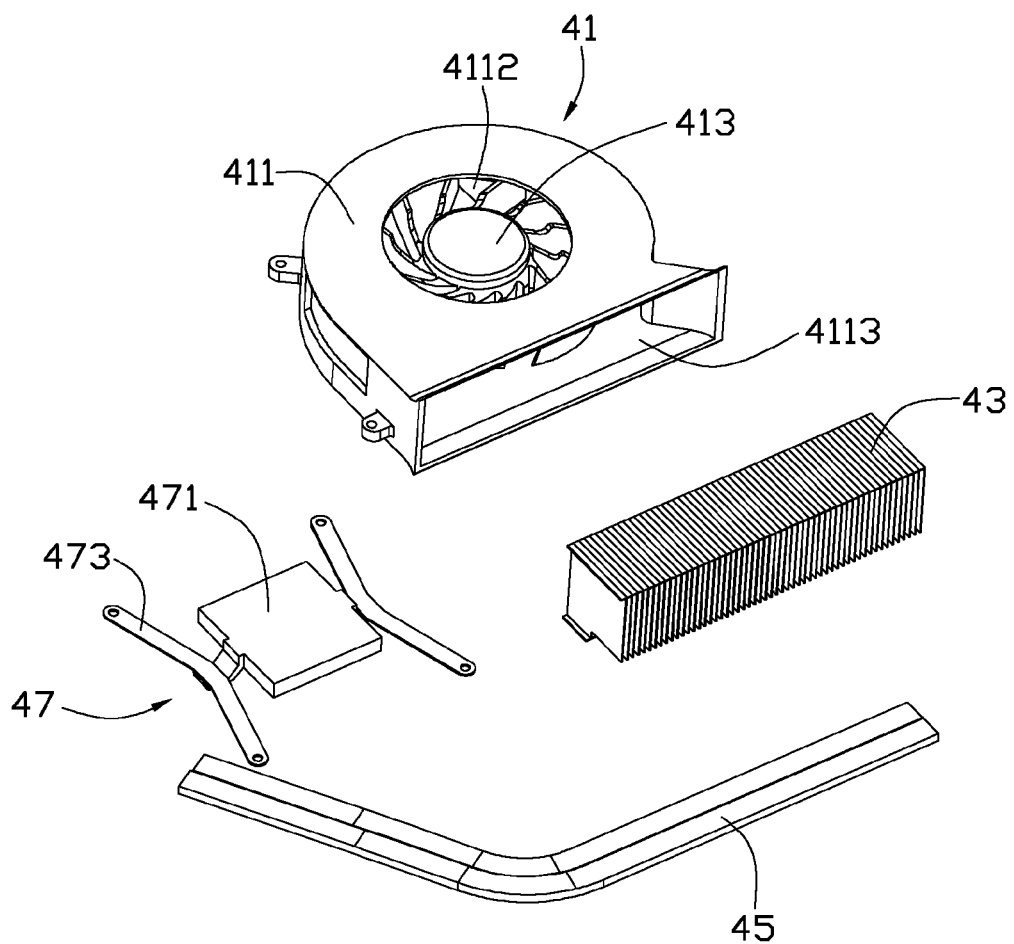
FIG. 2 is an exploded, isometric view of a first cooling assembly of FIG. 1.

Referring to FIG. 2, the first cooling assembly 40 includes a first fan module 41, a first cooler 43, a plurality of first heat pipes 45, and a first mounting member 47. The first fan module 41 includes a shell 411 and a first fan 413 secured in the shell 411. A top surface of the shell 411 defines a first air inlet 4112, and a side of the shell 411 defines a first air outlet 4113. In one embodiment, the first fan 413 is a centrifugal fan. The first mounting member 47 includes a receiving portion 471 and two mounting pieces 473 secured to the two opposite sides of the receiving portion 471. The first cooler 43 is located at the first air outlet 4113. A first end of each of the first heat pipes 45 is secured to the bottom of the first cooler 43, and a second end of each of the first heat pipes is secured to the receiving portion 471.

The second cooling assembly 50 can be substantially the same as the first cooling assembly 40, and include a second fan module 51, a second cooler 53, a second heat pipe 55, and a second mounting member 57. The second fan module 51 includes a second fan 513. The second cooling assembly 50 defines a second air inlet 5112 and a second air outlet (not shown) which faces the second cooler 53. In some embodiments, the second cooling assembly 50 can be the same as the first cooling assembly 40.

The blocking board 60 includes a body 61 and two securing pieces 63 extending from a bottom edge of the body 61. The securing pieces 63 are substantially perpendicular to the body 61. Each securing piece 63 defines a securing hole 631. An end of the body 61 defines a cutout 613. The greatest length of the body 61 along a first direction substantially parallel the motherboard 13, is substantially equal to the length of the side edge of the motherboard 13.

Figure 3:
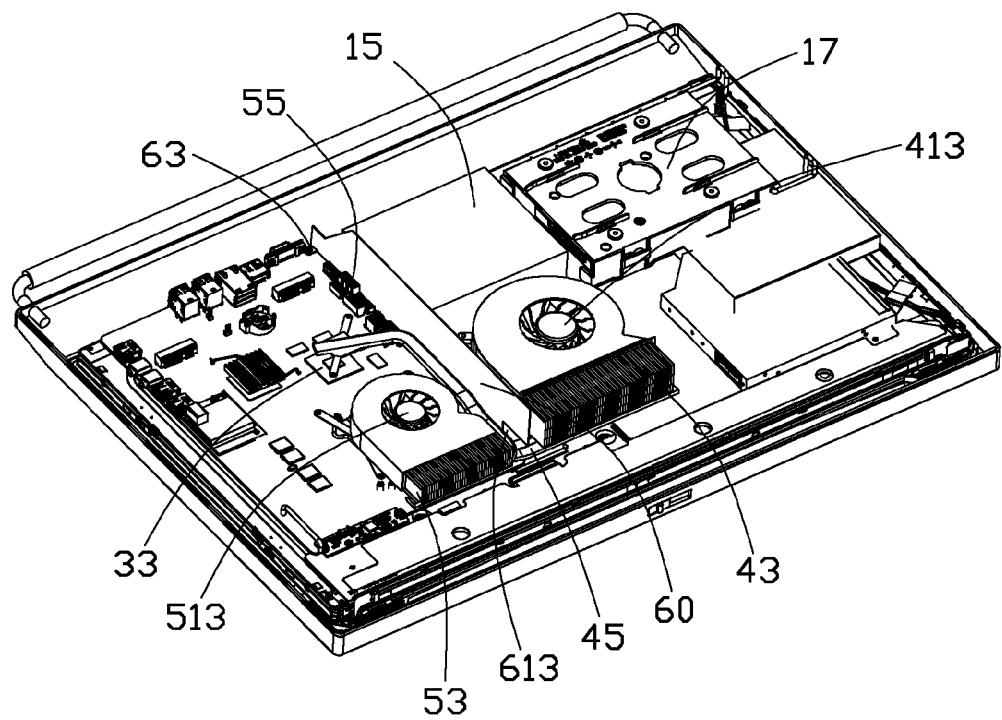
FIG. 3 is an assembled, isometric view of FIG. 1, but without a cover.
Figure 4:
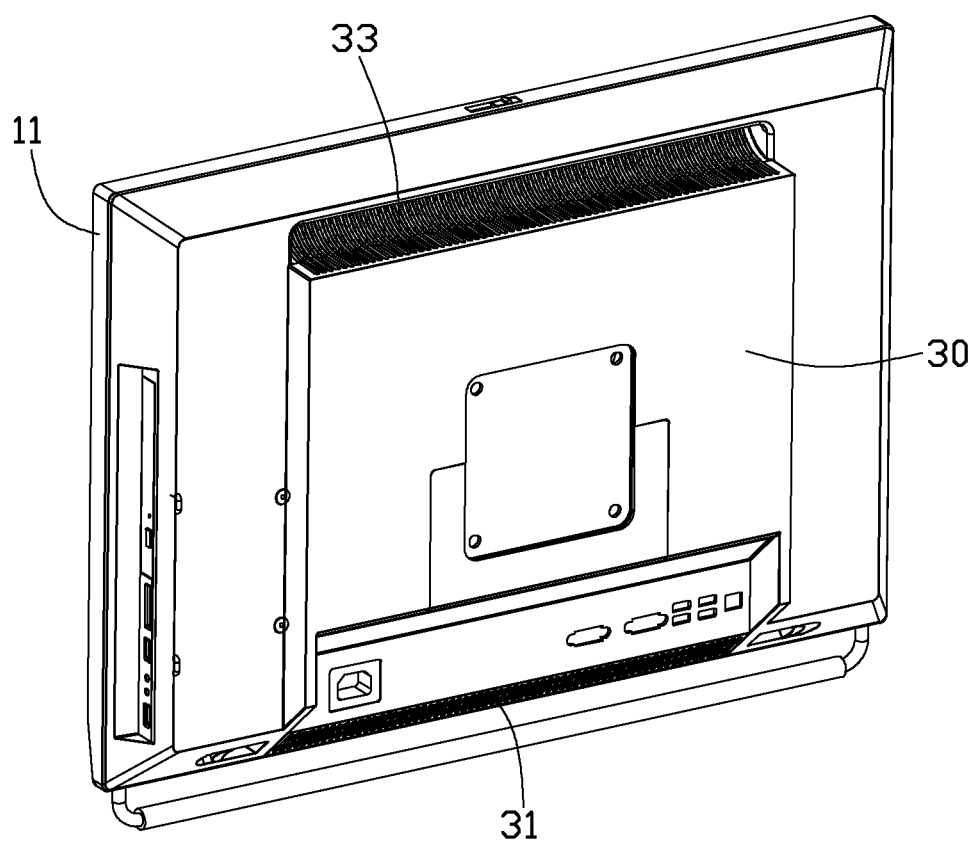
FIG. 4 is an assembled, isometric view of FIG. 1.

Referring to FIG. 3 and FIG. 4, in assembly, the securing hole 631 is aligned with the mounting hole 135. A locking member, such as a screw, is installed in the securing hole 631 and the mounting hole 135 to secure the blocking board 60 to the motherboard 13. The body 61 is substantially perpendicular to the motherboard 13. The first fan module 41 and the first cooler 43 are secured to the rear side of the enclosure 11 and are adjacent to the motherboard 13 and the first electronic component 15. The first mounting member 47 is secured to the motherboard 13. A bottom surface of the first mounting member 47 thermally contacts the first heat component 131. The first mounting member 47 and the first heat pipes 45 transmit heat of the first heat component 131 to the first cooler 43. The first heat pipes 45 are inserted through the cutout 613. The first cooler 43 is located between the first air outlet 4113 and the air outlet 33 of the cover 30. The second cooling assembly 50 is secured to the motherboard 13. The second mounting member 57 thermally contacts the second heat component 133. The second mounting member 57 and the second heat pipe 55 transmit heat of the second heat component 133 to the second cooler 53. The second cooler 53 is located between the second air outlet and the air outlet 33. The second cooler 53 and the first cooler 43 are separated by the blocking board 60. The cover 30 is secured to the rear side of the main body 10.

In use, the first fan 413 rotates. Heat generated by the first heat component 131 is transferred to the first cooler 43 from the first heat pipes 45. A first air path is defined by the air inlet 31, the first air inlet 4112, the first air outlet 4113, the first cooler 43, and the air outlet 33. Air flows into the electronic device from the air inlet 31. The first fan 413 guides air to flow by the first electronic component 15, the second electronic component 17, the first fan module 41, and the first cooler 43, then out of the electronic device through the first air outlet 4113 and the air outlet 33. Therefore, the first cooling assembly 40 not only cools the first heat component 131, but also cools the other electronic components besides the motherboard 13, such as the electronic component 15, and the second electronic component 17.

Heat generated by the second heat component 133 is transferred to the second cooler 53 from the second heat pipe 55. A second air path is defined by the air inlet 31, the second cooling assembly 50 and the air outlet 33. Air flows into the electronic device from the air inlet 31. The second fan 513 guides air to flow by the electronic components located on the motherboard 13, the second fan module 51, and the second cooler 53, then flow out of the electronic device through the second air outlet and the air outlet 33. Therefore, the second cooling assembly 50 not only cools the second heat component 133, but also cools other electronic components located on the motherboard 13.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. An electronic device comprising:
    an enclosure defining a rear side, a motherboard and a first cooling assembly secured to the rear side of the enclosure, and a second cooling assembly secured to the motherboard;
    a cover secured to the rear side and coving the rear side, and the cover defining a plurality of air inlets and a plurality of air outlets; and
    a blocking board, located between the first cooling assembly and the second cooling assembly, secured to a side of the motherboard;
    wherein a first air path is defined by the plurality of air inlets, the rear side besides the motherboard, the first cooling assembly and the plurality of air outlets, a second air path is defined by the plurality of air inlets, the motherboard, the second cooling assembly and the plurality of air outlets, and at least a portion of the first air path and the second air path are divided by the blocking board; the blocking board comprises a body and two securing pieces extending from the body, and two securing pieces are substantially perpendicular to the body and secured to the motherboard.

2. The electronic device of claim 1, wherein the body is substantially perpendicular to the motherboard.

3. The electronic device of claim 1, wherein the first cooling assembly comprises a first fan module and a first cooler, the first fan module defines a first air outlet, and the first cooler is located between the first air outlet and the plurality of air outlets.

4. The electronic device of claim 3, wherein the blocking board is secured to a side of the motherboard, and the enclosure is divided into a first area and a second area by the blocking board; and the first fan module and the first cooler are located in the first area, and the motherboard and the second cooling assembly are located in the second area.

5. The electronic device of claim 3, wherein the first cooling assembly further comprises a first heat pipe and a first mounting member; the first mounting member is secured to the motherboard and secures the first heat pipe to a first heat component, located on the motherboard; and the first heat pipe is connected to the first cooler.

6. The electronic device of claim 5, wherein the blocking board defines a cutout, and the first heat pipe abuts the first heat component through the cutout.

7. The electronic device of claim 1, wherein the second cooling assembly comprises a second fan module and a second cooler, the second fan module defines a second air outlet, and the second cooler is located between the second air outlet and the plurality of air outlets.

8. The electronic device of claim 7, wherein the second cooling assembly further comprises a second heat pipe connected to the second cooler, and the second heat pipe abuts a second heat component located to the motherboard.

9. The electronic device of claim 1, wherein the electronic device is an all-in-one computer.

10. An electronic device comprising:
    an enclosure defining a rear side, a motherboard and a first cooling assembly secured to the rear side of the enclosure, and a second cooling assembly secured to the motherboard;
    a cover secured to the rear side and for coving the rear side, and the cover defining a plurality of air inlets and a plurality of air outlets; and
    a blocking board, located between the first cooling assembly and the second cooling assembly, secured to a side of the motherboard;
    wherein the first cooling assembly comprises a first fan module and a first cooler, the first fan module defines a first air outlet, and the first cooler is located between the plurality of air outlets and the first air outlet; a first air path is defined by the plurality of air inlets, the rear side besides the motherboard, the first fan module, the first air outlet and the plurality of air outlets; a second air path is defined by the plurality of air inlets, the motherboard, the second cooling assembly and the plurality of air outlets, and at least a portion of the first air path and the second air path are divided by the blocking board.

11. The electronic device of claim 10, wherein the blocking board comprises a body and two securing pieces extending from the body, and the two securing pieces are substantially perpendicular to the body and secured to the motherboard.

12. The electronic device of claim 11, wherein the body is substantially perpendicular to the motherboard.

13. The electronic device of claim 10, wherein the first cooling assembly further comprises a first heat pipe and a first mounting member; the first mounting member is secured to the motherboard and secures the first heat pipe to a first heat component located on the motherboard, and the first heat pipe is connected to the first cooler.

14. The electronic device of claim 13, wherein the blocking board is secured to a side of the motherboard, and the enclosure is divided into a first area and a second area by the blocking board; and the first fan module and the first cooler are located in the first area, and the motherboard and the second cooling assembly are located in the second area.

15. The electronic device of claim 13, wherein the blocking board defines a cutout, and the first heat pipe abuts the first heat component through the cutout.

16. The electronic device of claim 10, wherein the second cooling assembly comprises a second fan module and a second cooler, the second fan module defines a second air outlet, and the second cooler is located between the second air outlet and the plurality of air outlets.

17. The electronic device of claim 16, wherein the second cooling assembly further comprises a second heat pipe connected to the second cooler, and the second heat pipe abuts a second heat component located to the motherboard.

18. The electronic device of claim 10, wherein the electronic device is an all-in-one computer.

19. An electronic device comprising:
an enclosure defining a rear side, a motherboard and a first cooling assembly secured to the rear side of the enclosure, and a second cooling assembly secured to the motherboard;
a cover secured to the rear side and coving the rear side, and the cover defining a plurality of air inlets and a plurality of air outlets; and
a blocking board, located between the first cooling assembly and the second cooling assembly, secured to a side of the motherboard;
wherein the blocking board defines a cutout for a heat pipe passing through; a first air path is defined by the plurality of air inlets, the rear side besides the motherboard, the first cooling assembly and the plurality of air outlets; and a second air path is defined by the plurality of air inlets, the motherboard, the second cooling assembly and the plurality of air outlets, and at least a portion of the first air path and the second air path are divided by the blocking board.

* * * * *